United States Patent
Zhang et al.

(10) Patent No.: US 12,524,841 B2
(45) Date of Patent: Jan. 13, 2026

(54) TECHNIQUES FOR PROCESSING VIDEOS USING TEMPORALLY-CONSISTENT TRANSFORMER MODEL

(71) Applicants: DISNEY ENTERPRISES, INC., Burbank, CA (US); ETH Zürich (Eidgenössische Technische Hochschule Zürich), Zurich (CH)

(72) Inventors: Yang Zhang, Dubendorf (CH); Mingyang Song, Zurich (CH); Tunc Ozan Aydin, Zurich (CH); Christopher Richard Schroers, Uster (CH)

(73) Assignees: Disney Enterprises, INC., Burbank, CA (US); ETH Zürich (Eidgenössische Technische Hochschule Zürich), Zürich (CH)

(*) Notice: Subject to any disclaimer, the term of this patent is extended or adjusted under 35 U.S.C. 154(b) by 698 days.

(21) Appl. No.: 17/876,373

(22) Filed: Jul. 28, 2022

(65) Prior Publication Data

US 2023/0281757 A1    Sep. 7, 2023

Related U.S. Application Data

(60) Provisional application No. 63/316,888, filed on Mar. 4, 2022.

(51) Int. Cl.
*G06T 5/70* (2024.01)
*G06T 3/18* (2024.01)

(52) U.S. Cl.
CPC ................ *G06T 5/70* (2024.01); *G06T 3/18* (2024.01); *G06T 2207/10016* (2013.01); *G06T 2207/20081* (2013.01); *G06T 2207/20084* (2013.01)

(58) Field of Classification Search
CPC ... G06T 5/70; G06T 3/18; G06T 2207/10016; G06T 2207/20081; G06T 2207/20084;
(Continued)

(56) References Cited

U.S. PATENT DOCUMENTS 11,610,387 B2 * 3/2023 Jouhikainen ......... G06V 10/443
12,002,257 B2 * 6/2024 Kandpal ................ G06N 20/00
(Continued)

FOREIGN PATENT DOCUMENTS

WO    WO-2020015492 A1 *  1/2020 ............. G06V 20/49
WO    WO-2023149898 A1 *  8/2023 ............. G06V 10/82

OTHER PUBLICATIONS

El-Nouby et al., "Xcit: Cross-Covariance Image Transformers", 35th Conference on neural information processing systems, 2021, 14 pages.
(Continued)

*Primary Examiner* — Mahendra R Patel
(74) *Attorney, Agent, or Firm* — Squire Patton Boggs LLP; Sarah Mirza

(57) ABSTRACT

Techniques are disclosed for enhancing videos using a machine learning model that is a temporally-consistent transformer model. The machine learning model processes blocks of frames of a video in which the temporally first input video frame of each block of frames is a temporally second to last output video frame of a previous block of frames. After the machine learning model is trained, blocks of video frames, or features extracted from the video frames, can be warped using an optical flow technique and transformed using a wavelet transform technique. The transformed video frames are concatenated along a channel dimension and input into the machine learning model that generates corresponding processed video frames.

18 Claims, 9 Drawing Sheets

(58) Field of Classification Search
CPC ............... G06T 5/60; G06T 3/4007; G06T 2207/20064; G06T 5/10; H04N 7/0127
USPC ................................................ 382/159
See application file for complete search history.

(56) References Cited

U.S. PATENT DOCUMENTS

| | | | | |
|---|---|---|---|---|
| 2019/0347806 | A1* | 11/2019 | Vajapey | G06T 7/20 |
| 2021/0216778 | A1* | 7/2021 | Ramaswamy | G06F 18/214 |
| 2022/0051382 | A1* | 2/2022 | Chen | H04N 21/4662 |
| 2022/0058400 | A1* | 2/2022 | Bianconcini | G06T 7/521 |
| 2022/0083785 | A1* | 3/2022 | Subramanian | G06V 20/46 |
| 2022/0239925 | A1* | 7/2022 | Topiwala | H04N 19/19 |
| 2022/0292649 | A1* | 9/2022 | Wang | G06T 5/60 |
| 2023/0080639 | A1* | 3/2023 | Zoss | G06T 5/77 382/100 |
| 2024/0022760 | A1* | 1/2024 | Li | H04N 19/132 |

OTHER PUBLICATIONS

Bertasius et al., "Is Space-Time Attention All You Need for Video Understanding?", arXiv:2102.05095, Jun. 9, 2021, 13 pages.

Buades et al., "A Non-Local Algorithm for Image Denoising", In 2005 IEEE Computer Society Conference on Computer Vision and Pattern Recognition, IEEE, vol. 2, 2005, pp. 60-65.

Cai et al., "Robust Image Denoising Using Kernel Predicting Networks", Eurographics, 2021, 4 pages.

Carion et al., "End-to-End Object Detection with Transformers", In European Conference on Computer Vision, arxiv:2005.12872, May 28, 2020, pp. 213-229.

Chan et al., "BasicVSR++: Improving Video Super-Resolution with Enhanced Propagation and Alignment", arXiv:2104.13371, Apr. 27, 2021, 12 pages.

Chen et al., "Pre-Trained Image Processing Transformer", In Proceedings of the IEEE/CVF Conference on Computer Vision and Pattern Recognition, 2021, pp. 12299-12310.

Dai et al., "Dynamic Head: Unifying Object Detection Heads with Attentions", In Proceedings of the IEEE/CVF Conference on Computer Vision and Pattern Recognition, arxiv:2106.08322, Jun. 15, 2021, pp. 7373-7382.

Dai et al., "CoAtNet: Marrying Convolution and Attention for all Data Sizes", Advances in Neural Information Processing Systems, 2021, 18 pages.

Dosovitskiy et al., "An Image is worth 16x16 Words: Transformers for Image Recognition at Scale", arXiv:2010.11929, Oct. 22, 2020, 21 pages.

Lai et al., "Learning Blind Video Temporal Consistency", In Proceedings of the European conference on computer vision (ECCV), arxiv: 1808.00449, Aug. 1, 2018, pp. 170-185.

Lei et al., "Blind Video Temporal Consistency via Deep Video Prior", 34th Conference on Neural Information Processing Systems, arxiv:2010.11838, Oct. 22, 2020, 11 pages.

Li et al., "Uniformer: Unified Transformer for Efficient Spatiotemporal Representation Learning", arXiv:2201.04676, Feb. 8, 2022, 19 pages.

Liang et al., "VRT: A Video Restoration Transformer", arxiv:2201.12288, Jun. 15, 2022, 14 pages.

Liang et al., "SwinIR: Image Restoration using Swin Transformer", In Proceedings of the IEEE/CVF International Conference on Computer Vision, arxiv:2108.10257, Aug. 23, 2021, 12 pages.

Liu et al., "Swin Transformer: Hierarchical Vision Transformer using Shifted Windows", arXiv:2103.14030, Aug. 17, 2021, 14 pages.

Maggioni et al., "Video Denoising, Deblocking, and Enhancement through Separable 4-D Nonlocal Spatiotemporal Transforms", IEEE Transactions on Image Processing, vol. 21, No. 9, Sep. 2012, pp. 3952-3966.

Maggioni et al., "Efficient Multi-Stage Video Denoising with Recurrent Spatio-Temporal Fusion", In Proceedings of the IEEE/CVF Conference on Computer Vision and Pattern Recognition, 2021, pp. 3466-3475.

Perazzi et al., "A Benchmark Dataset and Evaluation Methodology for Video Object Segmentation", In Proceedings of the IEEE conference on computer vision and pattern recognition, 2016, pp. 724-732.

Tassano et al., "Dvdnet: A Fast Network for Deep Video Denoising", In 2019 IEEE International Conference on Image Processing (ICIP), arxiv:1906.11890, Jun. 4, 2019, 6 pages.

Tassano et al., "FastDVDnet: Towards Real-Time Deep Video Denoising Without Flow Estimation", In Proceedings of the IEEE/CVF Conference on Computer Vision and Pattern Recognition, arxiv:1907.01361, Apr. 29, 2020, 13 pages.

Vaksman et al., "Patch Craft: Video Denoising by Deep Modeling and Patch Matching", arxiv:2103.13767, Oct. 30, 2021, 16 pages.

Vaswani et al., "Attention is All You Need", 34th Conference on Neural Information Processing Systems, arxiv:1706.03762, Dec. 6, 2017, 15 pages.

Wang et al., "First Image then Video: A Two-Stage Network for Spatiotemporal Video Denoising", arXiv:2001.00346, Jan. 22, 2020, 13 pages.

Xu et al., "End-to-End Semi-Supervised Object Detection with Soft Teacher", In Proceedings of the IEEE/CVF International Conference on Computer Vision, arxiv.2106.09018, Aug. 6, 2021, 10 pages.

Yang et al., "Focal Self-Attention for Local-Global Interactions in Vision Transformers", arXiv:2107.00641, Jul. 1, 2021, 21 pages.

Yu et al., "Metaformer is Actually What You Need for Vision", arXiv:2111.11418, Nov. 22, 2021, 14 pages.

Yuan et al., "Florence: A New Foundation Model for Computer Vision", arXiv:2111.11432, Nov. 22, 2021, 17 pages.

Yue et al., "Supervised Raw Video Denoising with a Benchmark Dataset on Dynamic Scenes", In Proceedings of the IEEE/CVF Conference on Computer Vision and Pattern Recognition, arxiv:2003.14013, Mar. 31, 2020, 10 pages.

Zamir et al., "Restormer: Efficient Transformer for High-Resolution Image Restoration", arXiv:2111.09881, Nov. 18, 2021, 12 pages.

Zhai et al., "Scaling Vision Transformers", arxiv:2106.04560, Jun. 8, 2021, 31 pages.

Zhang et al., "Beyond a Gaussian Denoiser: Residual Learning of Deep CNN for Image Denoising", DOI:10.1109/TIP.2017.2662206, IEEE transactions on Image Processing, vol. 26, No. 7, 2017, 14 pages.

Zhang et al., "Learning Deep CNN Denoiser Prior for Image Restoration", In Proceedings of the IEEE conference on computer vision and pattern recognition, arxiv:1704.03264, Apr. 11, 2017, 10 pages.

Zhang et al., "FFDNet: Toward A Fast and Flexible Solution for CNN Based Image Denoising", IEEE Transactions on Image Processing, vol. 27, No. 9, arxiv:1710.04026, May 22, 2018, 15 pages.

* cited by examiner

TECHNIQUES FOR PROCESSING VIDEOS USING TEMPORALLY-CONSISTENT TRANSFORMER MODEL

CROSS-REFERENCE TO RELATED APPLICATIONS

This application claims priority benefit of the U.S. Provisional patent application titled, "TECHNIQUES FOR PROCESSING VIDEOS USING TEMPORALLY-CONSISTENT TRANSFORMER MODEL," filed on Mar. 4, 2022 and having Ser. No. 63/316,888. The subject matter of this related application is hereby incorporated herein by reference.

BACKGROUND

Technical Field

Embodiments of the present disclosure relate generally to computer science and video processing and, more specifically, to techniques for processing videos using a temporally-consistent transformer model.

Description of the Related Art

The frames of a video can include various degradations, such as noise and blurriness. For example, a video captured by a camera can contain noise due to the mechanics of camera sensors. As another example, a video and/or frames thereof can be blurry when the video and/or frames are captured by a camera that is out of focus.

Transformer models are artificial neural networks. Conventional transformer models have been applied to some computer vision tasks, such as detecting objects within images and classifying those objects. However, when transformer models are used to process the frames of a video, the processed frames can have temporally inconsistent regions that vary from frame to frame, even when no such variations should occur. The temporally inconsistent regions are, as a general matter, readily noticeable as flickering and other artifacts that can greatly reduce the quality of processed videos.

As the foregoing illustrates, what is needed in the art are more effective techniques for processing videos using transformer models.

SUMMARY

One embodiment of the present disclosure sets forth a computer-implemented method for enhancing videos. The method includes processing a first plurality of video frames using a machine learning model to generate a first plurality of processed video frames. The method further includes processing a second plurality of video frames using the machine learning model to generate a second plurality of processed video frames. A temporally first video frame included in the second plurality of video frames is a temporally second to last video frame included in the first plurality of processed video frames.

Another embodiment of the present disclosure sets forth a computer-implemented method for training a machine learning model. The method includes adding a plurality of amounts of degradation to a set of video frames to generate a plurality of sets of degraded video frames. Each set of degraded video frames includes a different amount of degradation. The method further includes performing one or more operations to train the machine learning model based on the plurality of sets of degraded video frames. The one or more operations minimize a loss function that penalizes a difference between a temporally last frame of each plurality of processed video frames generated by the machine learning model and a temporally first frame of a subsequent plurality of processed video frames generated by the machine learning model.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that videos processed according to the disclosed techniques generally include fewer unwanted artifacts relative to videos processed using conventional transformer models. In particular, the disclosed techniques introduce fewer temporal inconsistencies into processed videos than conventional transformer models and substantially reduce flickering between adjacent frames of processed videos. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention can be practiced without one or more of these specific details.

System Overview

Figure 1:
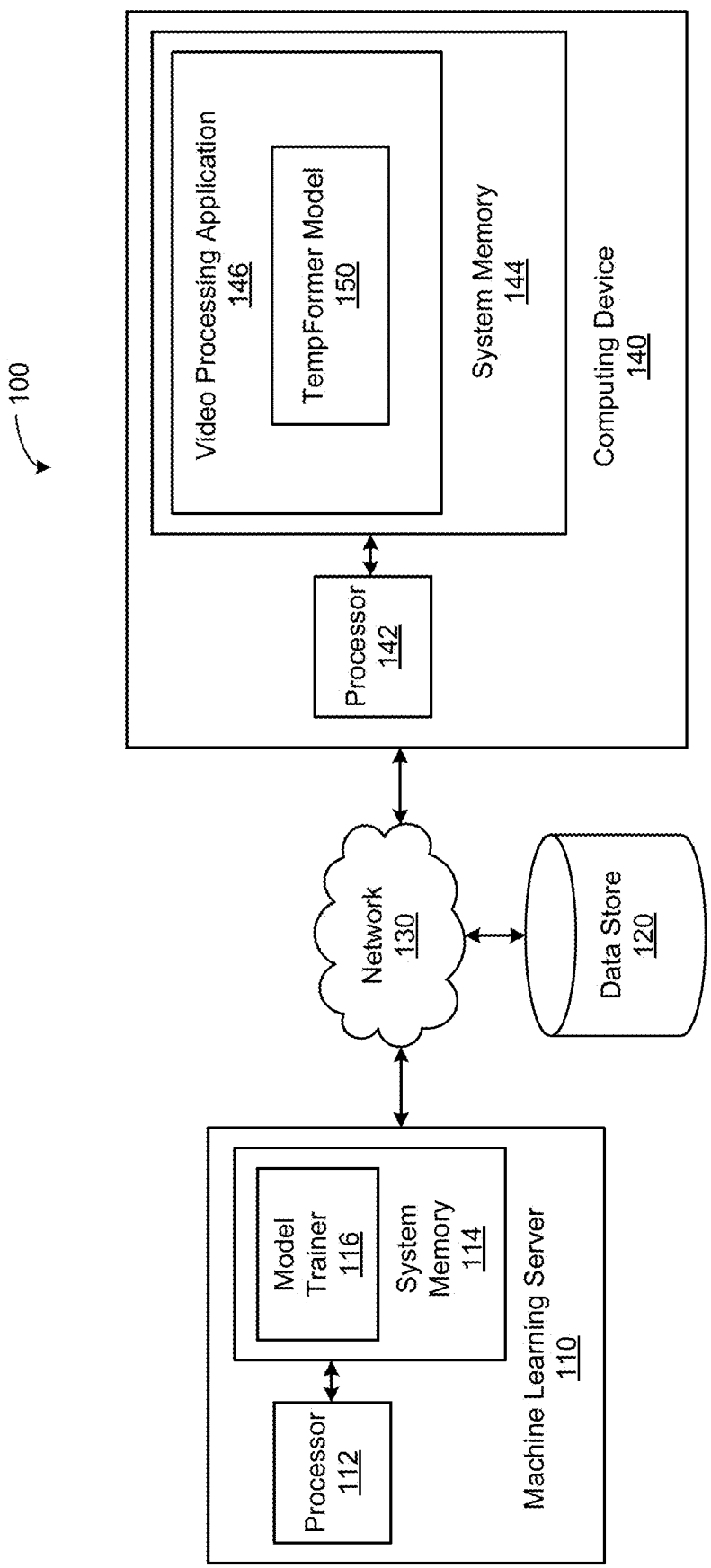
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard, a mouse, a joystick, a touchscreen, or a microphone. In operation, the processor 112 is the master processor of the machine learning server 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the machine learning server 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

In some embodiments, the model trainer 116 is configured to train one or more machine learning models, including a TempFormer model 150. The TempFormer model 150 is a temporally-consistent transformer model for video processing tasks. In some embodiments, the TempFormer model 150 can be a modification of the Vision Transformer architecture (ViT). Training data and/or trained machine learning models, including the TempFormer model 150, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

Once trained, the TempFormer model 150 can be deployed to perform any technically feasible video processing tasks for which the TempFormer model 150 was trained. In some embodiments, the TempFormer model 150 can be deployed to perform video enhancement tasks, such as video denoising, deblurring, interpolation, etc. Illustratively, a video processing application 146 that utilizes the TempFormer model 150 is stored in a system memory 144, and executes on a processor 142, of the computing device 140. In some embodiments, components of the computing device 140, including the system memory 144 and the processor 142 can be similar to corresponding components of the machine learning server 110.

It will be appreciated that the system 100 shown herein is illustrative and that variations and modifications are possible. For example, the number of machine learning servers and computing devices can be modified as desired. Further, the functionality included in any of the applications can be divided across any number of applications or other software that are stored and executed via any number of computing systems that are located in any number of physical locations.

Processing Videos Using TempFormer Model

Figure 2:
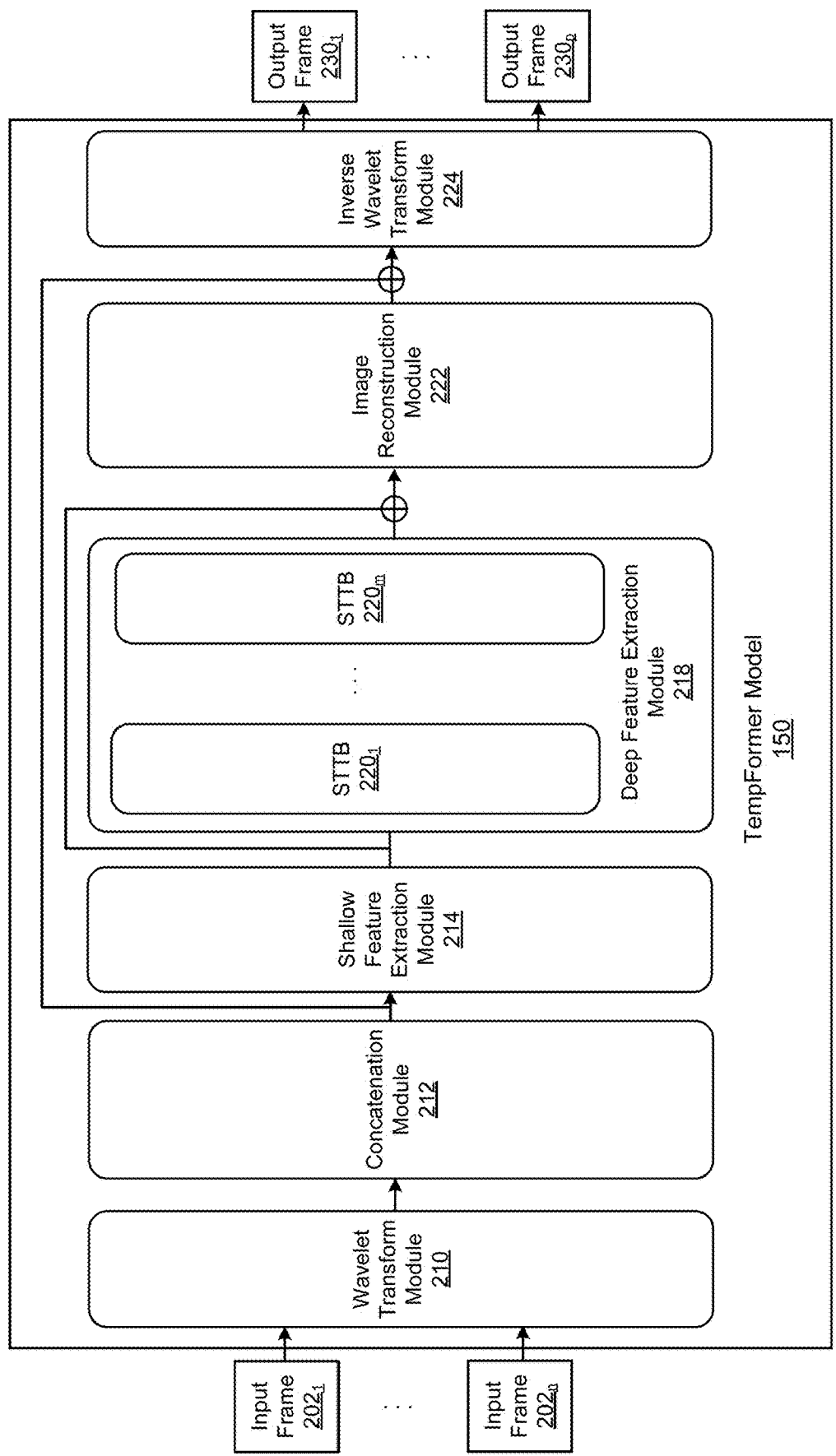
FIG. 2 illustrates in greater detail the TempFormer model of FIG. 1, according to various embodiments.

FIG. 2 illustrates in greater detail the TempFormer model 150 of FIG. 1, according to various embodiments. As shown, the TempFormer model 150 includes a wavelet transform module 210, a concatenation module 212, a shallow feature extraction module 214, a deep feature extraction module 218, an image reconstruction module 222, and an inverse wavelet transform module 224. The TempFormer model 150 receives as inputs a number of consecutive video frames $202_{1-n}$ (referred to herein collectively as input frames 202 and individually as an input frame 202) of a video and outputs a number of consecutive video frames $230_{1-p}$ (referred to herein collectively as output frames 230 and individually as an output frame 230). The TempFormer model 150 can receive any technically feasible number (e.g., five) of input frames 202 as input and output any technically feasible number (e.g., three) of output frames 230. In some embodiments, the input frames 202 can be input into the TempFormer model 150 as RGB (red, green, blue) channels.

In some embodiments, the TempFormer model 150 is a one-stage model that performs spatial and temporal processing simultaneously. As described, the TempFormer model 150 can take a number of consecutive input frames 202, such as 2×m+1 frames, as inputs and output a number of consecutive output frames 230, such as 2×n+1 frames. More formally, processing of video frames by the TempFormer model 150 can be expressed in the following form:

$$\{\hat{I}_{-n}^t, \hat{I}_{-n+1}^t, \ldots, \hat{I}_0^t, \ldots, \hat{I}_{n-1}^t, \hat{I}_n^t\} = \varphi(\{\tilde{I}_{-m}^t, \tilde{I}_{-m+1}^t, \ldots, \tilde{I}_0^t, \ldots, \tilde{I}_{m-1}^t, \tilde{I}_m^t\}), \quad (1)$$

where $\tilde{I}$ represents a frame from a temporal window of frames $Block^t$, which includes a set of contiguous frames and is also referred to herein as a "block" of frames, $\varphi$ is the TempFormer model 150, and $\hat{I}$ represents a processed frame of the temporal window of frames $Block^t$. Although the example of m=2 and n=1 is used in some of the formulas and figures herein for illustrative purposes, n and n can be any positive integers in embodiments. To introduce communications between neighboring temporal windows of frames, m can be set to be strictly larger than n so that neighboring temporal windows share multiple common input frames. Within a temporal window of frames Block$^t$, input frames can exchange information in spatial-temporal transformer (STTB) blocks $220_{1-m}$ (referred to herein collectively as STTB blocks 220 and individually as a STTB block 220) so that the output frames 230 that are output by the TempFormer model 150 are intrinsically temporally stable. For two neighboring temporal windows of frames, slight discrepancies can exist in the output frames 230 because neighboring temporal windows share a limited number of frames in common. More specifically, flickering artifacts can exist between the temporally last output frame of the temporal window of frames Block$^t$, namely $\hat{I}_n^t$, and the temporally first output frame of the next temporal window of frames Block$^{t+1}$, namely $\hat{I}_{-n}^{t+1}$. Such flickering can be reduced or eliminated using (1) a recurrent architecture in which the temporal window of frames Block$^{t+1}$ gets one processed reference frame from the previous temporal window of frames Block$^t$, and (2) a temporal consistency loss term, discussed in greater detail below in conjunction with FIG. 6.

In operation, the wavelet transform module 210 decomposes each of the input frames 202 into wavelet sub-bands. Such a decomposition reduces the spatial resolution for computational efficiency purposes. In addition, the reduced spatial resolution enables much longer features, which can improve the performance of the TempFormer model 150. In some embodiments, the wavelet transform module 210 halves the resolution of the input frames 202 to solve the problem that the size of an attention map SoftMax($QK^T$/$\sqrt{D}$+bias) in the TempFormer model 150 is $w^2 \times w^2$, which can be a bottleneck that affects the computational efficiency of the TempFormer model 150. The wavelet transform module 210 alleviates such a bottleneck. Although described herein primarily with respect to a wavelet transform, other types of decompositions, such as pixel shuffle, can be used in some embodiments. In some embodiments, the input frames 202 can also be warped using an optical flow that is calculated from the input frames 202 prior to performing a decomposition on the warped input frames 202. Warping the input frames 202 using the optical flow can improve the signal-to-noise ratio of the TempFormer model 150 relative to conventional transformer modules, which oftentimes produce pixel misalignments in the temporal domain that appear as ghosting artifacts and blurriness. In some other embodiments, features extracted from the input frames 202 can be warped rather than the input frames 202, themselves.

The concatenation module 212 concatenates the wavelet sub-bands that are output by the wavelet transform module 210 along the channel dimension. The channel dimension includes features from different frames. Concatenating along the channel dimension changes the input so that a transformer, shown as STTB blocks 220, fuses features spatially and temporally, as discussed in greater detail below. The spatial and temporal fusing of features can reduce or eliminate temporal inconsistencies in the output frames 230 that are output by the TempFormer model 150.

The shallow feature extraction module 214 includes a three-dimensional (3D) convolution layer that converts frequency channels in the concatenated sub-bands output by the concatenation module 212 into shallow features. That is, the shallow feature extraction module 214 changes the frequency of the sub-bands into features in feature space. The 3D convolution performed by the shallow feature extraction module 214 can also improve temporal fusion by the STTB blocks 220.

The deep feature extraction module 218 includes a number of STTB blocks 220. The STTB blocks 220 provide attention mechanisms that fuse features at different spatial and temporal positions of the input frames 202. In particular, the STTB blocks 220 spatially and temporally mix the features of tokens to integrate the information of the input frames 202. Each token is a patch (e.g., a 16×16 pixel patch) at a distinct position within the input frames 202. As discussed in greater detail below in conjunction with FIG. 4, the STTB blocks 220 project features of each token to a query key and value, which acts as a feature mixer. Because the wavelet sub-bands of the input frames 202 were concatenated along the feature channel, the features also include temporal information. As a result, the feature mixing will also produce temporal mixing.

Following the STTB blocks 220 is the image reconstruction module 222, which includes another 3D convolution layer that transforms the features back into frequency space. Then, the inverse wavelet transform module 224 converts the sub-bands that are output by the 3D convolution layer into the output frames 230 that have the original resolution of the input frames 202.

Figure 3:
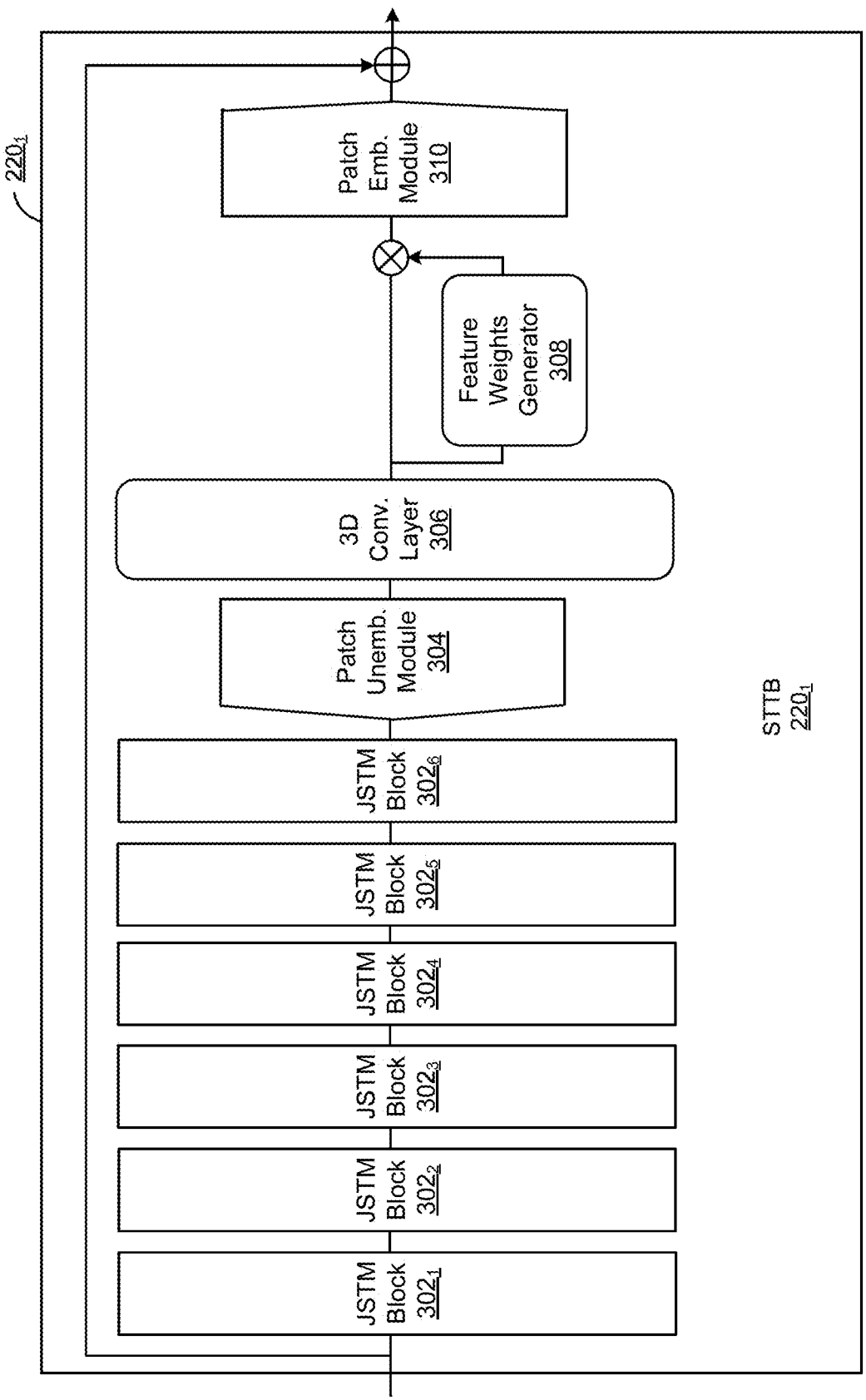
FIG. 3 illustrates in greater detail the spatial-temporal transformer block of FIG. 2, according to various embodiments.

FIG. 3 illustrates in greater detail the STTB block $220_1$ of FIG. 2, according to various embodiments. The other STTB blocks 220 of FIG. 2 include similar features as the STTB block $220_1$. As shown, the STTB block $220_1$ includes joint spatial-temporal mixer (JSTM) blocks $302_{1-6}$ (referred to herein collectively as JSTM blocks 302 and individually as a JSTM block 302), a patch unembedding module 304, a 3D convolution layer 306, a feature weights generator 308, and a patch embedding module 310. Although six JSTM blocks 302 are shown for illustrative purposes, a STTB block can include any technically feasible number of JSTM blocks in some embodiments (i.e., more than six JSTM blocks or less than six JSTM blocks).

The JSTM blocks 302 are attention layers that perform spatial and temporal mixing jointly. The spatial and temporal mixing fuses features from different frames spatially and temporally. In some embodiments, spatial and temporal attention is also learned simultaneously. Illustratively, the STTB block $220_1$ includes a sequence of JSTM blocks 302 followed by the patch unembedding 304 module, the 3D convolution layer 306, and the patch embedding module 310. The patch unembedding module 304 and the patch embedding module 310 are used to combine patches output by the JSTM block $302_6$ into an image and split an image generated using the 3D convolution layer 306 and weights from the feature weights generator 308 into patches, respectively. The 3D convolution layer 306 performs further feature extraction on the image that is output by the patch unembedding module 304 to extract deep features. The 3D convolution layer 306 is used, rather than a 2D convolution layer, to enhance the interaction between neighboring frames and reduce temporal inconsistency in the output frames 230. Because all of the input frames 202 are concatenated along the channel dimension and there is a relatively large amount of temporal mixing in the TempFormer model 150, each output frame 230 can include some patterns from neighboring output frames 230. The feature weights generator 308 is an adaptive pooling layer that generates weights for each feature that are used to alleviate ghosting artifacts.

Figure 4:
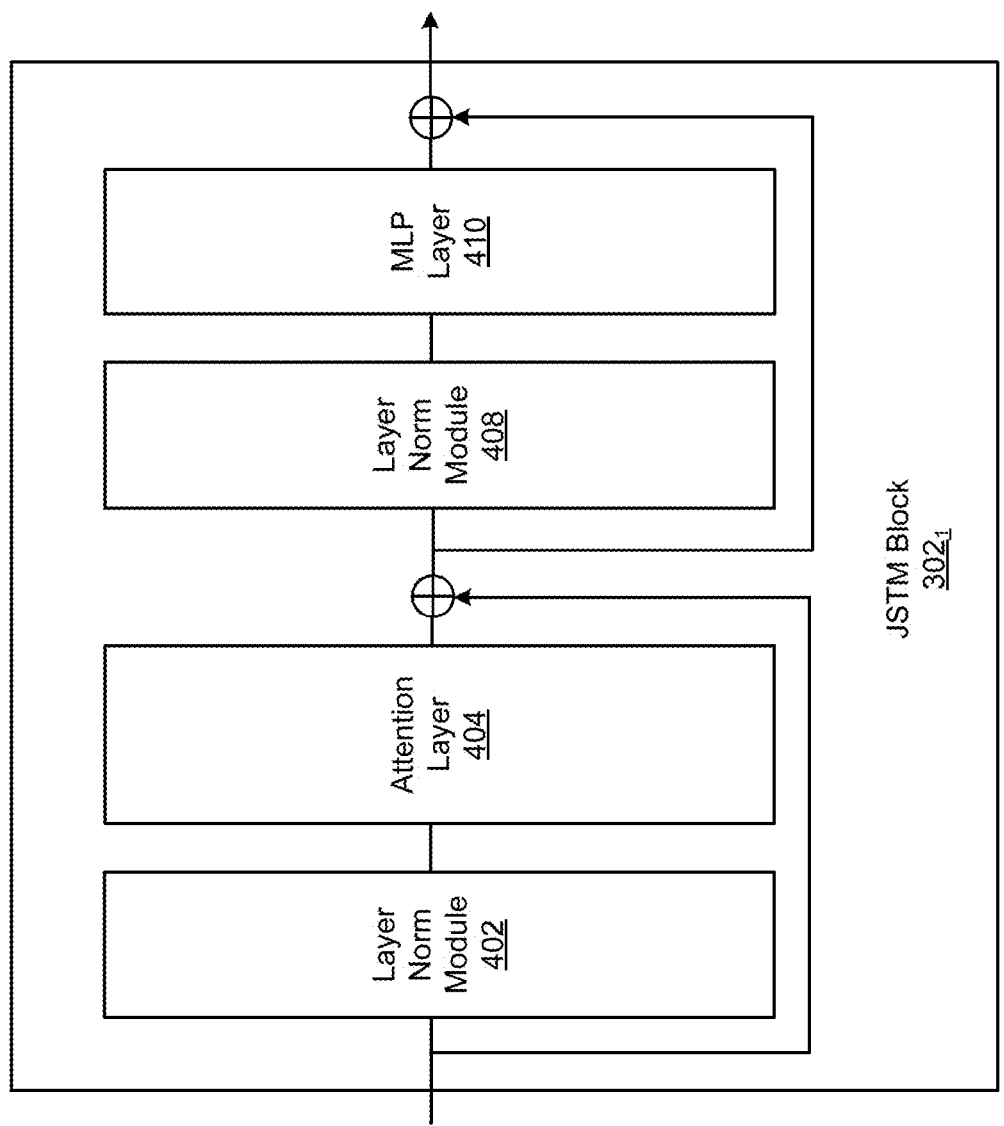
FIG. 4 illustrates in greater detail the joint spatio-temporal mixer of FIG. 3, according to various embodiments.

FIG. 4 illustrates in greater detail the JSTM block $302_1$ of FIG. 3, according to various embodiments. The other JSTM blocks 302 of FIG. 2 include similar features as the JSTM block $302_1$. As shown, the JSTM block $302_1$ includes a layer norm module 402, an attention layer 404, another layer norm module 408, and a multilayer perceptron (MLP) layer 410. As described, the JSTM block $302_1$ is an attention layer that performs spatial and temporal mixing jointly. Since the channel dimension includes features from different frames, the input images are divided into non-overlapping spatial windows with size w×w in some embodiments. An attention layer of a vision transformer can be interpreted as a spatial tokens mixer in which the weights for each token are content-dependent. In addition to spatial mixing, the JSTM block $302_1$ can also mix channels. Assume that in feature space, the channel length of each frame is c. In such cases, the temporal mixing is performed when generating the queries (Q), keys (K), and values (V) from the features of the tokens, which can be expressed as the following formula:

$$Q=XP_Q, K=XP_K, V=XP_V, \quad (2)$$

where $X \in \mathbb{R}^{w^2 \times 5c}$ are the features of all frames before mixing, and $\{P_Q, P_K, P_V\} \in \mathbb{R}^{5c \times 5d}$ are linear projections that project the features into $\{Q,K,V\} \in \mathbb{R}^{w^2 \times 5}d$. Because all input frames 202 are concatenated along the channel dimension, each $\{q_{i,j}, k_{i,j}, v_{i,j}\} \in \mathbb{R}^{5d}$ integrates the features of all input frames 202 at spatial position (i,j), namely $x_{i,j} \in \mathbb{R}^{5c}$. The concatenation process can be described as:

$$q_{i,j} = x_{i,j}P_Q, k_{i,j} = x_{i,j}P_k, v_{i,j} = x_{i,j}P_V, \quad (3)$$

$$q_{i,j} = cat\left[q_{i,j}^{I-2,\ldots,2}\right], k_{i,j} = cat\left[k_{i,j}^{I-2,\ldots,2}\right], v_{i,j} = cat\left[v_{i,j}^{I-2,\ldots,2}\right], \quad (4)$$

where $n \in \{-2, -1, 0, 1, 2\}$ and $\{q_{i,j}^{I_n}, k_{i,j}^{I_n}, v_{i,j}^{I_n}\} \in \mathbb{R}^c$ is the query, key, and value of the token in frame n with spatial position (i,j).

Mixing only along the channel dimension is not enough to integrate temporal information because motions in the frames of a video introduce offsets between pairs of pixels in different frames. The following spatial mixing can place all spatial and temporal information to a reference token $y_{i,j}^{I_n}$, at a spatial location (i',j') of frame $I_n(\langle \bullet, \bullet \rangle : V \times V \to \mathbb{R})$ $$y_{i',j'}^{I_n} = \Sigma_{i=1,j=1}^{i=w,j=w} \frac{\langle q_{i',j'}^{I_n}, k_{i,j}^{I_n}\rangle}{norm_{i',j'}^{I_n}} v_{i,j}^{I_n}, norm_{i',j'}^{I_n} = \Sigma_{i=1,j=1}^{i=w,j=w}\langle q_{i',j'}^{I_n}, k_{i,j}^{I_n}\rangle. \quad (5)$$

For example, the query $(q_{i',j'}^{I_0})$, key $(k_{i',j'}^{I_0})$, and value $(v_{i',j'}^{I_0})$, of the reference token $x_{i',j'}^{I_0}$, integrate the features of all frames at position (i',j'). In like manner, the query $(q_{i,j}^{I_0})$, key $(k_{i,j}^{I_0})$, and value $(v_{i,j}^{I_0})$ integrate the features of all frames at position (i,j). The attention between $x_{i',j'}^{I_0}$, and $x_{i,j}^{I_0}$ fuses the features of all frames at both positions (i',j') and (i,j), which results in a spatio-temporal fusion.

The foregoing formulas written in matrix form is the computation function of the attention mechanism in a vision transformer:

$$\text{Attention}(Q, K, V) = \text{SoftMax}\left(\frac{QK^T}{\sqrt{D}} + \text{bias}\right)V, \quad (6)$$

where D is the length of the features of each token. For example, in some embodiments, the length D can be D=5d, where d is the length of the features for each video frame. Assuming that five frame are taken as input and concat-enated along the feature dimension, the concatenated tensor has the feature length of D=5d (number of frames times the length of features for each frame). In equation (6), bias is a trainable relative position bias, which can increase the capacity of the TempFormer model 150.

The MLP 410 layer in JSTM block $302_1$ also acts as a temporal mixer. Before feeding tokens to a next STTB block 220, the 3D convolution layer 306 and the feature weights generator 308, which is an adaptive pooling layer, are used to extract additional features. The end-to-end connection of the STTB blocks 220 places multiple spatial and temporal mixers together. The entire process can be expressed as:

$$cat[Y^{I-2},Y^{I-1},Y^{I_0},Y^{I_1},Y^{I_2}]=\text{JSTM}(cat[X^{I-2},X^{I-1},X^{I_0},X^{I_1}, X^{I_2}]), \quad (7)$$

$$Y^{I-2},Y^{I-1},Y^{I_0},Y^{I_1},Y^{I_2}=\text{Conv3D}(Y^{I-2},Y^{I-1},Y^{I_0},Y^{I_1},Y^{I_2}), \quad (8)$$

$$\text{Weights}=\text{Sigmoid}(\text{Conv3D}(\text{AdaptivePooling}(Y^{I-2},Y^{I-1}, Y^{I_0},Y^{I_1},Y^{I_2})), \quad (9)$$

$$Y^{I_n}=Y^{I_n}\odot\text{Weights}+X^{I_n}, \quad (10)$$

where Weights is used to assign different weights to the features of each frame, and $\odot$ represents element-wise multiplication.

Figure 5:
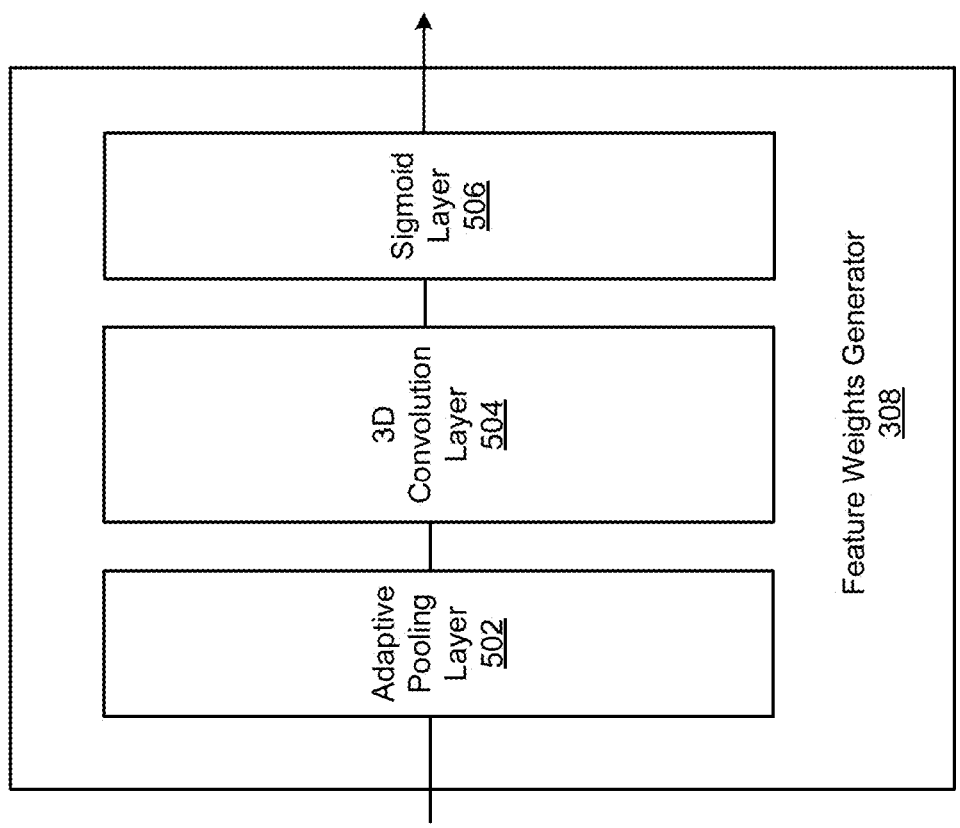
FIG. 5 illustrates in greater detail the feature weights generator of FIG. 3, according to various embodiments.

FIG. 5 illustrates in greater detail the feature weights generator 308 of FIG. 3, according to various embodiments. As shown, the feature weights generator 308 includes an adaptive pooling layer 502, a 3D convolution layer 504, and a sigmoid layer 506. The feature weights generator 308 generates weights that are used to weight each feature output by the 3D convolution layer 306. Weighting of the features can alleviate ghosting artifacts in the processed output frames 230 relative to features that are not weighted.

Figure 6:
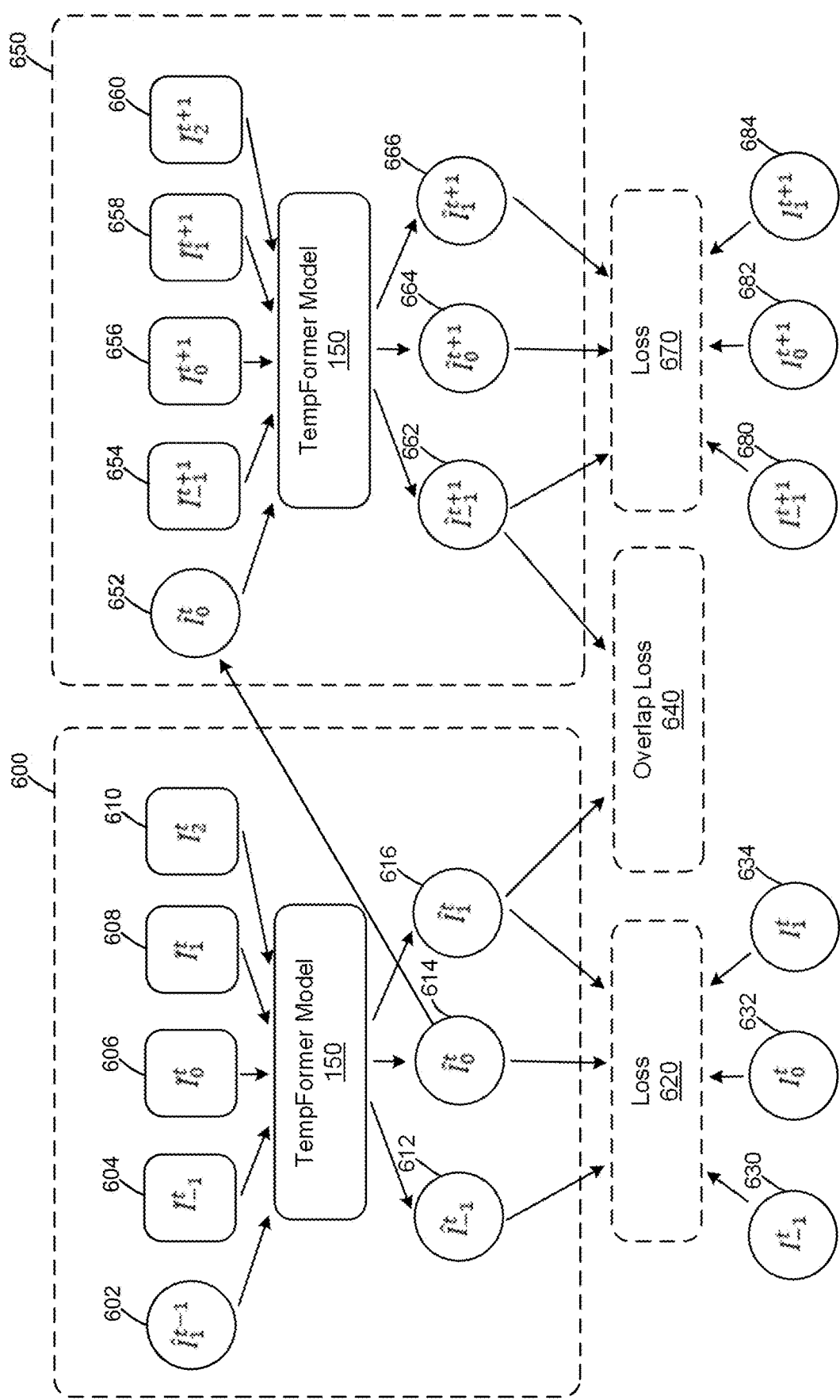
FIG. 6 illustrates the combination of a recurrent architecture of the TempFormer model and use of an overlap loss term during training, according to various embodiments.

FIG. 6 illustrates the combination of a recurrent architecture of the TempFormer model 150 and use of an overlap loss term during training, according to various embodiments. As shown, the recurrent architecture uses a temporally second to last frame 614 from a sequence of consecutive output frames 612, 614, and 616 of a video that the TempFormer model 150 generates after processing a sequence of consecutive input frames 602, 604, 606, 608, and 610 of a temporal window of frames 600 from the video as the temporally first frame 652 of a sequence of consecutive input frames 652, 654, 656, 658, and 660 of a subsequent temporal window of frames 650 from the video. The TempFormer model 150 then processes the input frames 652, 654, 656, 658, and 660 to generate a subsequent sequence of consecutive output frames 662, 664, and 666.

In some embodiments, an overlap loss term 640 is used during training of the TempFormer model 150 to penalize a difference between a temporally last frame (e.g., output frame 616) that the TempFormer model 150 generates for a temporal window (e.g., temporal window 600) and the temporally first output frame (e.g., output frame 662) that the TempFormer model 150 generates for a subsequent temporal window. After introducing the overlap loss term 640, the number of overlapping frames between the frames 612, 614, and 616 that are output by the TempFormer model 150 for the temporal window of frames 600 and the input frames 652, 654, 656, 658, and 660 for the subsequent window of frames 650 is two, so the temporally second to last frame 614 corresponds to, and is used as, the temporally first input frame 652. Illustratively, the TempFormer model 150 can be trained using a loss function that combines the overlap loss term 640 with losses 620 and 670 between the sequences of output frames 612, 614, and 616 and 662, 664, and 666 and corresponding sequences of ground truth reference frames 630, 632, 634, and 680, 682, and 684, respectively.

More formally, even when neighboring temporal windows of frames share 2(m−n) input frames, degradations in the remaining 2n+1 input frames vary in each temporal window, which is the root cause of temporal incoherency across temporal windows. In some embodiments, to solve the temporal incoherency problem, the recurrent architecture shown in FIG. 6 is used to enforce a connection between neighboring temporal windows. As described, the connection between neighboring temporal windows uses the temporally first input frame of a temporal window of frames Block$^{t+1}$ as the temporally last output frame of a previous temporal window of frames Block$^{t}$, which can be expressed as:

$$\text{Block}^{t+1}: \{\hat{I}_{-1}^{t+1}, \hat{I}_0^{t+1}, \hat{I}_1^{t+1}\} = \phi(\{\hat{I}_1^{t}, \tilde{I}_{-1}^{t+1}, \tilde{I}_0^{t+1}, \tilde{I}_1^{t+1}, \tilde{I}_2^{t+1}\}). \quad (11)$$

The recurrent architecture spreads the information from all frames of a current temporal window of frames Block$^{t}$ to a next temporal window of frames Block$^{t+1}$ by propagating the temporally second to last processed frame of the current temporal window Block$^{t}$ as the temporally first input frame of the next temporal window Block$^{t+1}$. The substitution of the temporally first input frame of the next temporal window with the temporally second to last processed frame from the previous temporal window provides prior knowledge to each temporal window of frames, thereby enhancing the connection between neighboring temporal blocks and achieving better temporal consistency. However, reconstruction errors can also propagate from one temporal window of frames to a next temporal window of frames. In addition, across temporal windows of frames, dynamic content and static content with periodical occlusion (e.g., when the legs of a dancer sweep over) can still be temporally inconsistent.

To solve the problem of temporal inconsistency of dynamic content across temporal windows of frames, the stride used to divide a video sequence can be modified so that neighboring temporal windows of frames share 2(m−n)+1 common input frames. In addition, the overlap loss term 640 is used during training of the TempFormer model 150 to enforce temporal consistency between the temporally last processed frame of a temporal window of frames Block$^{t}$ and the temporally first processed frame of a next temporal window of frames Block$^{t+1}$. The overlap loss term 640 can be expressed as:

$$\mathcal{L}_{overlap}^{t} = |\hat{I}_n^{t} - \hat{I}_{-n}^{t+1}|, \quad (12)$$

where $\mathcal{L}_{overlap}^{t}$ is the l1 loss between the temporally last output frame of the temporal window Block$^{t}$ and the temporally first output frame of the next temporal window Block$^{t+1}$. The total loss $\mathcal{L}_{total}$ includes two parts: (1) the first part $\mathcal{L}_{block}^{t}$ is the loss between the processed frames Î and the corresponding reference frames I for each temporal window of frames, shown as loss terms 620 and 670; and (2) the second part is the overlap loss $\mathcal{L}_{overlap}^{t}$ of equation (12). In some embodiments, a hyper parameter α can be used to balance the spatial and temporal loss, as shown in the following formulas:

$$\mathcal{L}_{block}^{t} = \frac{1}{2n+1} \Sigma_{i=-n}^{n} |\hat{I}_i^{t} - I_i^{t}|, \quad (13)$$

$$\mathcal{L}_{total} = \frac{1}{T} \Sigma_{t=0}^{T} \mathcal{L}_{block}^{t} + \alpha \frac{1}{T-1} \Sigma_{t=0}^{T-1} \mathcal{L}_{overlap}^{t}, \quad (14)$$

where T is the index of the temporal windows in the video sequence. In example of FIG. 6, the recurrent strategy after introducing the overlap loss term 640 $\mathcal{L}_{overlap}^{t}$ can be formulated as Block$^{t+1}$: $\{\hat{I}_{-1}^{t+1}, \hat{I}_0^{t+1}, \hat{I}_1^{t+1}\} = \phi\{\hat{I}_0^{t}, \tilde{I}_{-1}^{t+1}, \tilde{I}_0^{t+1}, \tilde{I}_1^{t+1}, \tilde{I}_2^{t+1}\}$.

In some embodiments, training of the TempFormer model 150 includes a spatial-temporal video processing phase and a temporal coherency enhancement phase. In the spatial-temporal video processing phase, one temporal window of frames is processed in each training step. During the temporal coherency enhancement phase, two neighboring temporal windows of frames (Block$^0$ and Block$^1$) are loaded for processing in each training step. For the first temporal window, the first noisy input frame is substituted with the corresponding ground truth frame to simulate the recurrent architecture, described above. Then, the temporally first input frame ($\tilde{I}_{-2}^{t}$ when five neighboring frames are included in each temporal window that is input into the TempFormer model 150) of the second temporal window is replaced with the temporally second to last output frame of the first temporal window ($\hat{I}_0^{0}$ when three neighboring frames are output by the TempFormer model 150), and the overlap loss of equation (12) is added to the common output frames of the first and second temporal windows ($\hat{I}_1^{0}$ and $\hat{I}_{-1}^{1}$ when three neighboring frames are output by the TempFormer model 150).

Figure 7A:
FIG. 7A illustrates an exemplar residual between the temporally first processed frame of a block of frames and the temporally last processed frame of a previous block of frames before temporal consistency enhancement, according to various embodiments.

FIG. 7A illustrates an exemplar residual 700 between the temporally first processed frame of a block of frames and the temporally last processed frame of a previous block of frames before temporal consistency enhancement, according to the various embodiments. As shown, the exemplar residual 700 indicates significant temporal inconsistency between the temporally first processed frame of the block and the temporally last processed frame of the previous block. In particular, the temporally first frame of the block and the temporally last processed frame of the previous block have inconsistent regions that vary between those frames, when such variations should not occur when both frames depict similar subject matter.

Figure 7B:
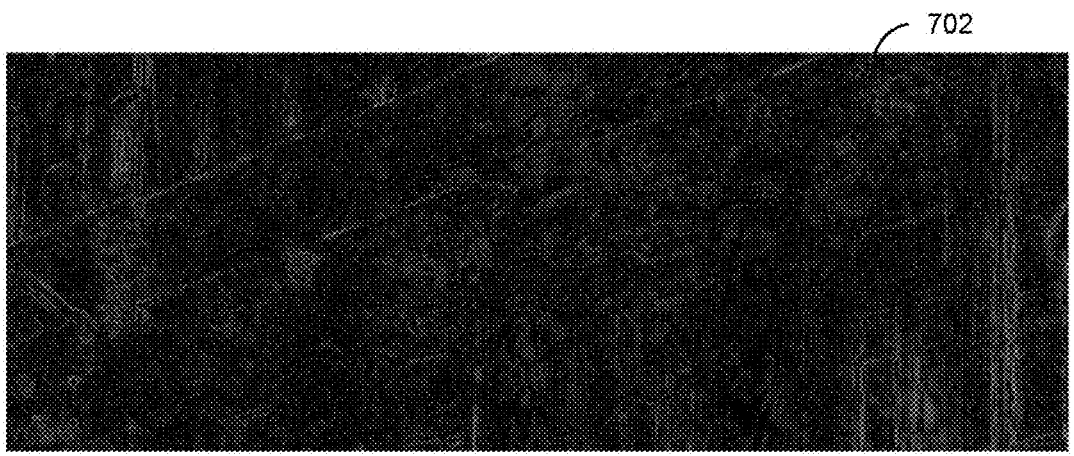
FIG. 7B illustrates an exemplar residual between the temporally first processed frame of a block of frames and the temporally last processed frame of a previous block of frames after temporal consistency enhancement, according to various embodiments.

FIG. 7B illustrates an exemplar residual 702 between the temporally first processed frame of a block of frames and the temporally last processed frame of a previous block of frames after temporal consistency enhancement using the recurrent architecture and overlap described above in conjunction with FIG. 6, according to the various embodiments. As shown, the exemplar residual 702 indicates that there is less temporal inconsistency between the temporally first processed frame of a block and the temporally last processed frame of a previous block than indicated by the residual 700, described above in conjunction with FIG. 7A. Not only is the temporal consistency between neighboring temporal windows of frames improved, the coherency between neighboring frames inside each temporal window is also improved. Compared with a recurrent architecture without the overlap loss term $\mathcal{L}_{overlap}^{t}$, use of the recurrent architecture along with the overlap loss term $\mathcal{L}_{overlap}^{t}$ generates processed frames in which dynamic content and static content with periodical occlusions can have substantially the same temporal stability as static content in a video sequence being processed.

Figure 8:
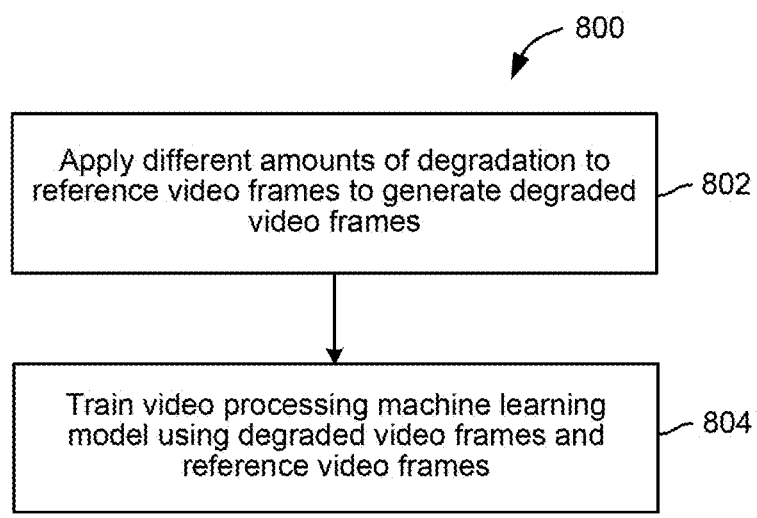
FIG. 8 sets forth a flow diagram of method steps for training a video processing machine learning model, according to various embodiments.

FIG. 8 sets forth a flow diagram of method steps for training a video processing machine learning model, according to various other embodiments. Although the method steps are described in conjunction with the systems of FIGS. 1-6, persons of ordinary skill in the art will understand that any system configured to perform the method steps, in any order, is within the scope of the present disclosure.

As shown, a method 800 begins at step 802, where the model trainer 116 applies different amounts of degradation to reference video frames to generate degraded video frames. In some embodiments, the model trainer 116 can apply different amounts of any technically feasible type of degradation. For example, the model trainer 116 could apply Gaussian noise to reference video frames to generate the first training video frames having different amounts of noise. In some embodiments, the model trainer 116 can add different amounts of any technically feasible type of blur (e.g., Gaussian blur) to reference video frames to generate blurred video frames. In such cases, the model trainer 116 can also add noise to the blurred video frames to generate the second training video frames having different amounts of blurriness and noise.

At step 804, the model trainer 116 trains a video processing machine learning model using the degraded video frames generated at step 802 and the reference video frames. In some embodiments, the video processing machine learning model is trained to take as inputs a block of consecutive frames of a video, with a temporally first frame of the block being a temporally second to last processed frame from a previous block of consecutive frames, if any, and to output consecutive processed frames. In some embodiments, the video processing machine learning model can be the TempFormer model 150, described above in conjunction with FIGS. 1-5. In some embodiments, the video processing machine learning model can be trained to minimize the loss function of equation (14). In some embodiments, training of the video processing machine learning model includes the spatial-temporal video processing phase and the temporal coherency enhancement phase, described above in conjunction with FIG. 6.

Figure 9:
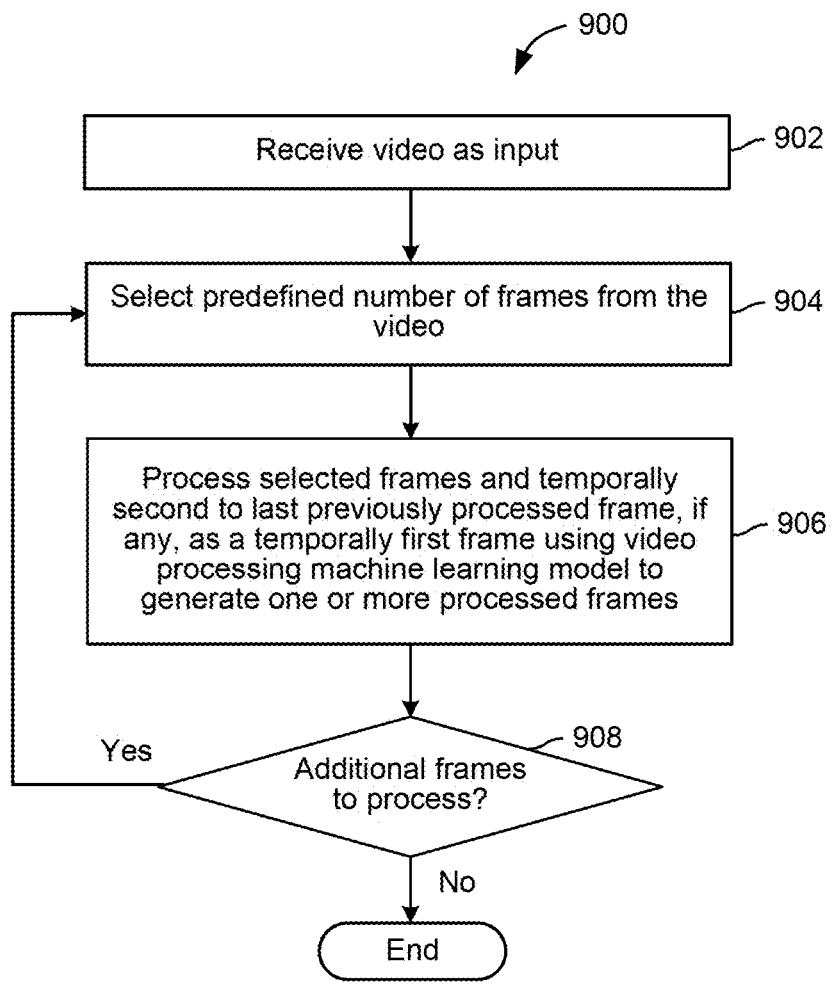
FIG. 9 sets forth a flow diagram of method steps for processing a video, according to various embodiments.

FIG. 9 sets forth a flow diagram of method steps for processing a video, according to various other embodiments. Although the method steps are described in conjunction with the systems of FIGS. 1-6, persons of ordinary skill in the art will understand that any system configured to perform the method steps, in any order, is within the scope of the present disclosure.

As shown, a method 900 begins at step 902, where the video processing application 146 receives a video as input. For example, the video could be captured using a camera or rendered via a Monte Carlo rendering technique, and the video could include degradation such as noise, blurriness, and/or the like that the video processing application 146 can reduce or eliminate.

At step 904, the video processing application 146 selects a predefined number of consecutive video frames from the video. For example, the video processing application 146 could select five frames, or any suitable predefined number of frames larger than one, that a video processing machine learning model (e.g., TempFormer model 150) is trained to take as inputs. Experience has shown that using five input frames achieves a relatively desirable balance between denoising quality and computational efficiency. Using more input frames generally consumes more computational resources, resulting in longer processing times. However, any suitable number of input frames larger than one can be used in some embodiments, such as a number that is chosen based on the available computational resources and the video processing task being performed. It should be noted that changing the number of input frames will require retraining the video processing machine learning model.

At step 906, the video processing application 146 processes (1) the selected frames and (2) a temporally second to last previously processed frame, if any, as a temporally first frame, using the video processing machine learning model to generate one or more processed frames. In some embodiments, the video processing machine learning model is the TempFormer model 150, described above in conjunction with FIGS. 1-5. When multiple processed frames are generated by the video processing machine learning model, the processed frames are consecutive frames.

At step 908, if there are additional frames to process, then the method 900 returns to step 904, where the video processing application 146 selects another predefined number of frames from the video for processing. If there are no additional frames to process, the method 900 ends.

In sum, techniques are disclosed for enhancing videos using a TempFormer machine learning model that is a temporally-consistent transformer model. In some embodiments, the TempFormer model includes a recurrent architecture that processes blocks of frames of a video in which the temporally first input video frame of each block of video frames is a temporally second to last output video frame of a previous block of video frames. The TempFormer model is trained using a loss function to minimize a difference between the temporally last video frame of a block of processed video frames output by the TempFormer model and the temporally first video frame of a subsequent block of processed video frames output by the TempFormer model. The TempFormer model can be trained to perform various low-level video processing tasks, such as video denoising, deblurring, interpolation, etc. After training, blocks of video frames, or features extracted from the video frames, can be warped using an optical flow technique and transformed using a wavelet or other transform technique. The transformed video frames are concatenated along a channel dimension and input into the TempFormer model that generates corresponding processed video frames.

At least one technical advantage of the disclosed techniques relative to the prior art is that videos processed according to the disclosed techniques generally include fewer unwanted artifacts relative to videos processed using conventional transformer models. In particular, the disclosed techniques introduce fewer temporal inconsistencies into processed videos than conventional transformer models and substantially reduce flickering between adjacent frames of processed videos. These technical advantages represent one or more technological improvements over prior art approaches.

1. In some embodiments, a computer-implemented method for enhancing videos comprises processing a first plurality of video frames using a machine learning model to generate a first plurality of processed video frames, and processing a second plurality of video frames using the machine learning model to generate a second plurality of processed video frames, wherein a temporally first video frame included in the second plurality of video frames is a temporally second to last video frame included in the first plurality of processed video frames.

2. The computer-implemented method of clause 1, further comprising performing one or more operations to train the machine learning model using a loss function that penalizes a difference between a temporally last frame of a plurality of processed training video frames generated by the machine learning model and a temporally first frame of a subsequent plurality of processed training video frames generated by the machine learning model.

3. The computer-implemented method of clauses 1 or 2, wherein processing the first plurality of video frames using the machine learning model comprises performing one or more transform operations on each video frame included in the first plurality of video frames to generate a plurality of transformed video frames, concatenating the plurality of transformed video frames along a channel dimension to generate a concatenated set of transformed video frames, and inputting the concatenated set of transformed video frames into the machine learning model.

4. The computer-implemented method of any of clauses 1-3, wherein the one or more transform operations include at least one of (1) one or more wavelet transform operations or (2) one or more pixel shuffle operations.

5. The computer-implemented method of any of clauses 1-4, further comprising generating an optical flow based on the first plurality of video frames, and warping either the first plurality of video frames or features extracted from the first plurality of video frames based on the optical flow.

6. The computer-implemented method of any of clauses 1-5, further comprising adding a plurality of amounts of degradation to a set of video frames to generate a plurality of sets of degraded video frames, wherein each set of degraded video frames includes a different amount of the degradation, and training the machine learning model based on the plurality of sets of degraded video frames.

7. The computer-implemented method of any of clauses 1-6, wherein the degradation comprises at least one of noise or blur.

8. The computer-implemented method of any of clauses 1-7, wherein the machine learning model comprises a transformer model.

9. The computer-implemented method of any of clauses 1-8, wherein the machine learning model comprises one or more three-dimensional (3D) convolution layers.

10. In some embodiments, one or more non-transitory computer-readable storage media include instructions that, when executed by one or more processing units, cause the one or more processing units to perform steps for enhancing videos, the steps comprising processing a first plurality of video frames using a machine learning model to generate a first plurality of processed video frames, and processing a second plurality of video frames using the machine learning model to generate a second plurality of processed video frames, wherein a temporally first video frame included in the second plurality of video frames is a temporally second to last video frame included in the first plurality of processed video frames.

11. The one or more non-transitory computer-readable storage media of clause 10, wherein the instructions, when executed by the one or more processing units, further cause the one or more processing units to perform the step of performing one or more operations to train the machine learning model using a loss function that penalizes a difference between a temporally last frame of a plurality of processed training video frames generated by the machine learning model and a temporally first frame of a subsequent plurality of processed training video frames generated by the machine learning model.

12. The one or more non-transitory computer-readable storage media of clauses 10 or 11, wherein processing the first plurality of video frames using the machine learning model comprises performing one or more transform operations on each video frame included in the first plurality of video frames to generate a plurality of transformed video frames, concatenating the plurality of transformed video frames along a channel dimension to generate a concatenated set of transformed video frames, and inputting the concatenated set of transformed video frames into the machine learning model.

13. The one or more non-transitory computer-readable storage media of any of clauses 10-12, wherein the one or more transform operations include at least one of one or more wavelet transform operations or one or more pixel shuffle operations.

14. The one or more non-transitory computer-readable storage media of any of clauses 10-13, wherein the instructions, when executed by the one or more processing units, further cause the one or more processing units to perform the steps of generating an optical flow based on the first plurality of video frames, and warping either the first plurality of video frames or features extracted from the first plurality of video frames based on the optical flow.

15. The one or more non-transitory computer-readable storage media of any of clauses 10-14, wherein the instructions, when executed by the one or more processing units, further cause the one or more processing units to perform the steps of adding a plurality of amounts of degradation to a set of video frames to generate a plurality of sets of degraded video frames, wherein each set of degraded video frames includes a different amount of the degradation, and training the machine learning model based on the plurality of sets of degraded video frames.

16. The one or more non-transitory computer-readable storage media of any of clauses 10-15, wherein the degradation comprises at least one of noise or blur.

17. The one or more non-transitory computer-readable storage media of any of clauses 10-16, wherein the machine learning model comprises a transformer model.

18. The one or more non-transitory computer-readable storage media of any of clauses 10-17, wherein the machine learning model comprises one or more three-dimensional (3D) convolution layers.

19. In some embodiments, a computer-implemented method for training a machine learning model comprises adding a plurality of amounts of degradation to a set of video frames to generate a plurality of sets of degraded video frames, wherein each set of degraded video frames includes a different amount of degradation, and performing one or more operations to train the machine learning model based on the plurality of sets of degraded video frames, wherein the one or more operations minimize a loss function that penalizes a difference between a temporally last frame of each plurality of processed video frames generated by the machine learning model and a temporally first frame of a subsequent plurality of processed video frames generated by the machine learning model.

20. The method of clause 19, further comprising processing a first plurality of video frames using the machine learning model to generate a first plurality of processed video frames, and processing a second plurality of video frames using the machine learning model to generate a second plurality of processed video frames, wherein a temporally first video frame included in the second plurality of video frames is a temporally second to last video frame included in the first plurality of processed video frames.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for enhancing videos, the method comprising:
   receiving, from a video, a first plurality of video frames and a second plurality of video frames;
   processing the first plurality of video frames using a machine learning model to generate a first plurality of processed video frames;
   replacing a temporally first video frame included in the second plurality of video frames with a temporally second to last video frame included in the first plurality of processed video frames; and
   processing the second plurality of video frames using the machine learning model to generate a second plurality of processed video frames.

2. The computer-implemented method of claim 1, further comprising performing one or more operations to train the machine learning model using a loss function that penalizes a difference between a temporally last frame of a plurality of processed training video frames generated by the machine learning model and a temporally first frame of a subsequent plurality of processed training video frames generated by the machine learning model.

3. The computer-implemented method of claim 1, wherein processing the first plurality of video frames using the machine learning model comprises:
   performing one or more transform operations on each video frame included in the first plurality of video frames to generate a plurality of transformed video frames;
   concatenating the plurality of transformed video frames along a channel dimension to generate a concatenated set of transformed video frames; and
   inputting the concatenated set of transformed video frames into the machine learning model.

4. The computer-implemented method of claim 3, wherein the one or more transform operations include at least one of (1) one or more wavelet transform operations or (2) one or more pixel shuffle operations.

5. The computer-implemented method of claim 1, further comprising:
   generating an optical flow based on the first plurality of video frames; and warping either the first plurality of video frames or features extracted from the first plurality of video frames based on the optical flow.

6. The computer-implemented method of claim 1, further comprising:
adding a plurality of amounts of degradation to a set of video frames to generate a plurality of sets of degraded video frames, wherein each set of degraded video frames included in the plurality of sets of degraded video frames includes a different amount of the degradation; and
training the machine learning model based on the plurality of sets of degraded video frames.

7. The computer-implemented method of claim 6, wherein the degradation comprises at least one of noise or blur.

8. The computer-implemented method of claim 1, wherein the machine learning model comprises a transformer model.

9. The computer-implemented method of claim 1, wherein the machine learning model comprises one or more three-dimensional (3D) convolution layers.

10. One or more non-transitory computer-readable storage media including instructions that, when executed by one or more processing units, cause the one or more processing units to perform steps for enhancing videos, the steps comprising:
receiving, from a video, a first plurality of video frames and a second plurality of video frames;
processing the first plurality of video frames using a machine learning model to generate a first plurality of processed video frames;
replacing a temporally first video frame included in the second plurality of video frames with a temporally second to last video frame included in the first plurality of processed video frames; and
processing the second plurality of video frames using the machine learning model to generate a second plurality of processed video frames.

11. The one or more non-transitory computer-readable storage media of claim 10, wherein the instructions, when executed by the one or more processing units, further cause the one or more processing units to perform the step of:
performing one or more operations to train the machine learning model using a loss function that penalizes a difference between a temporally last frame of a plurality of processed training video frames generated by the machine learning model and a temporally first frame of a subsequent plurality of processed training video frames generated by the machine learning model.

12. The one or more non-transitory computer-readable storage media of claim 10, wherein processing the first plurality of video frames using the machine learning model comprises:
performing one or more transform operations on each video frame included in the first plurality of video frames to generate a plurality of transformed video frames;
concatenating the plurality of transformed video frames along a channel dimension to generate a concatenated set of transformed video frames; and
inputting the concatenated set of transformed video frames into the machine learning model.

13. The one or more non-transitory computer-readable storage media of claim 12, wherein the one or more transform operations include at least one of one or more wavelet transform operations or one or more pixel shuffle operations.

14. The one or more non-transitory computer-readable storage media of claim 10, wherein the instructions, when executed by the one or more processing units, further cause the one or more processing units to perform the steps of:
generating an optical flow based on the first plurality of video frames; and
warping either the first plurality of video frames or features extracted from the first plurality of video frames based on the optical flow.

15. The one or more non-transitory computer-readable storage media of claim 10, wherein the instructions, when executed by the one or more processing units, further cause the one or more processing units to perform the steps of:
adding a plurality of amounts of degradation to a set of video frames to generate a plurality of sets of degraded video frames, wherein each set of degraded video frames included in the plurality of sets of degraded video frames includes a different amount of the degradation; and
training the machine learning model based on the plurality of sets of degraded video frames.

16. The one or more non-transitory computer-readable storage media of claim 15, wherein the degradation comprises at least one of noise or blur.

17. The one or more non-transitory computer-readable storage media of claim 10, wherein the machine learning model comprises a transformer model.

18. The one or more non-transitory computer-readable storage media of claim 10, wherein the machine learning model comprises one or more three-dimensional (3D) convolution layers.

* * * * *